United States Patent [19]
Berg et al.

[11] Patent Number: 5,574,604
[45] Date of Patent: Nov. 12, 1996

[54] INNER DIAMETER DISK DRIVE HEAD/SLIDER LOAD/UNLOAD DEVICE

[75] Inventors: Lowell J. Berg; Zine-Eddine Boutaghou, both of Rochester; Thomas S. Larson, Altura; Dallas W. Meyer, Burnsville; Jay M. Mosbrucker, Rochester; Jerry L. Neubauer, Stewartville; Hal H. Ottesen, Rochester, all of Minn.

[73] Assignee: International Business Machines Coporation, Armonk, N.Y.

[21] Appl. No.: 416,938

[22] Filed: Apr. 4, 1995

Related U.S. Application Data

[63] Continuation of Ser. No. 172,366, Dec. 21, 1993, abandoned.

[51] Int. Cl.⁶ .............................. G11B 5/54; G11B 21/22
[52] U.S. Cl. .............................................................. 360/105
[58] Field of Search ...................................... 360/105, 106

[56] References Cited

U.S. PATENT DOCUMENTS

| 4,139,874 | 2/1979 | Shiraishi | 360/86 |
|---|---|---|---|
| 4,686,592 | 8/1987 | Carroll et al. | 360/98.07 |
| 4,714,740 | 12/1987 | Lee et al. | 525/79 |
| 4,752,848 | 6/1988 | Garcia et al. | 360/105 |
| 5,095,395 | 3/1992 | Wakatsuki | 360/105 |
| 5,231,549 | 7/1993 | Morehouse et al. | 360/105 |
| 5,241,438 | 8/1993 | Matsushima | 360/105 |
| 5,289,325 | 2/1994 | Morehouse et al. | 360/105 |

FOREIGN PATENT DOCUMENTS

| 0222647 | 5/1987 | European Pat. Off. | 360/109 |
|---|---|---|---|
| 2203482 | 8/1990 | Japan | 360/103 |
| 3100981 | 4/1991 | Japan . | |
| 3122879 | 5/1991 | Japan . | |
| 2237920 | 5/1991 | United Kingdom . | |
| 9211630 | 7/1992 | WIPO . | |

Primary Examiner—Robert S. Tupper
Assistant Examiner—William R. Korzuch
Attorney, Agent, or Firm—Laurence R. Letson; Matthew J. Bussan

[57] ABSTRACT

A load/unload device to remove the slider from the proximity of the magnetic recording surface of a disk in a disk drive whenever the disk is to be stopped. The load/unload device is a ramp-like wedge which extends generally radially from the center of the magnetic disk and to the magnetic recording surface of the magnetic disk. When the slider is moved toward the center of the disk by an actuator mechanism, the end of the load arm supporting the slider, referred to as a tang, will engage the inclined plane of the wedge and lift the slider from the surface of the magnetic disk as the slider is translated closer to the center of the disk. Once the slider has been removed from close proximity of the disk, the tang may engage a trough-like surface on the structure supporting the wedge and will effectively detent the position of the slider through the forces exerted on the tang by the load beam of the actuator. Thus the disk will be protected from undesirable and damaging impacts of the slider against the magnetic recording surface of the disk thereby prolonging disk utility.

3 Claims, 3 Drawing Sheets

INNER DIAMETER DISK DRIVE HEAD/SLIDER LOAD/UNLOAD DEVICE

This application is a continuation of application Ser. No. 08/172,366, filed Dec. 21, 1993, now abandoned.

FIELD OF THE INVENTION

This invention relates to the construction of a direct access storage device (DASD) and specifically to the removal technique and storage of the slider of a DASD prior to disk drive shutdown.

BACKGROUND OF THE INVENTION

Sliders in DASD disk drives may be withdrawn from the magnetic disk surface prior to the shutdown of the disk drive in order to insure that the slider does not come into contact with the disk and also to prevent damage to the disk surface whenever the disk drive is repowered and the disks are again rotated. In larger disk drives, the space exists for a retraction and locking mechanism to hold the magnetic head and slider in a retracted position. As disk drives are reduced in size, space becomes a premium commodity and thus dictates that the withdrawal of the head from the surface of the disk be accomplished in a manner which consumes minimal space.

In more compact disk drives, sliders may be stored in a region of the disk surface which does not contain magnetic recording material or which would not contain any stored information that could be lost or damaged as a result of the contact of a magnetic head and slider with the surface of the disk. These areas are typically designated as landing zones. As the disk stops spinning, the air flow between the disk and the slider becomes depressurized and the slider, due to the preloading forces exerted thereon by the load beam, settles onto the surface of the disk.

In very small form factor DASD, the drive motors are not strong and do not provide large torques. Spin-up times may be significantly extended when sliders are in contact with the disks. In some cases the friction forces between the slider and the disk at the slider/disk interface are so large with regard to the torque of the drive motor that the motor will not start.

The lower velocity of the disk relative to the slider at the inner diameter of the disk results in less entrainment and fewer perturbations experienced by the slider, which leads to a lower likelihood of slider impact during the loading of the slider onto the disk.

Examples of landing zones on disk drive magnetic recording disks are disclosed in U.S. Pat. No. 4,139,874, issued to Shiraishi and U.S. Pat. No. 5,095,395, issued to Wakatsuki. Their landing zones do not remove the head from the surface of the disk or maintain it substantially spaced from the surface of the disk whenever the disk is in a non-powered condition.

Inner landing zones consume considerably less recordable area on the disk surface and, therefore, are preferred to landing zones disposed about the outer periphery of the disk.

Although landing zones do permit the landing of the slider in a region where no magnetic recording material and/or no recorded data exist, it is still preferable to remove the slider from the disk surface for storage in order that no damage can occur to the slider and magnetic head therein as well as to prevent damage to the recording magnetic disk surface upon restart. Removal of the slider also facilitates restart of the disk and disk run-up by minimizing start-up friction.

An example of an unloading device is disclosed in U.S. Pat. No. 4,752,848, issued to Garcia, et. al. The unloading device of Garcia, et. al., constitutes a high angle relatively steep ramp onto which the end of the load beam is engaged and forced onto in a direction substantially coaxial with the longitudinal axis of the load beam. The retention of the slider in a raised or removed position is dependent upon the continued force exerted on the load beam by an actuator mechanism. Without such actuator force, both the spring forces, known as preload exerted on the end of the load beam as well as the deflection forces stored in the load beam and actuator arm when forced toward the ramp, will cause the load beam to slide back down the inclined surface and will permit the magnetic head and slider to contact the surface of the magnetic recording disk. Garcia, et. al., requires some type of retention device to lock the actuator mechanism in the displaced position so that the sliders/magnetic heads are held withdrawn from the disk surface.

SUMMARY OF THE INVENTION

It is an object of the invention to unload the slider from the disk and to retain the slider in an unloaded position.

It is another object of the invention to provide smooth transition during the loading of a slider onto an air film above the recording surface of a magnetic disk in order to prevent slider/disk crashes.

Still another object of the invention is to retain the load beam and slider in a retracted position such that the slider is removed from proximity to the disk recording surface whenever the disk is not rotating.

It is a further object of the invention to retain the load beam in the unloaded position without interlocks and locking devices designed to block movement of the load beam and actuator arm.

The disadvantages of the prior art are overcome and the objects of the invention are accomplished by a shallow wedge-shaped ramp positioned both to lift the load beam away from the disk surface and also to retain the load beam and slider in a retracted position. The ramp or wedge-shaped surface has a shallow rise or slope necessary in order to reduce forces required to unload the slider from the disk surface. The load/unload device further comprises a detenting region on the surface, formed by continuation of the ramp and formed into a trough shape, to accept a portion of the load beam and to restrict lateral movement of the load beam in a power-off condition or whenever the disks are not rotating. The shallow slope also reduces the potential for slider/disk impact during the loading of the head onto an air film which will support the head above the rotating disk.

By removing the slider from the disk, spin-up time is minimized and the drive motor can be better optimized for low power spinning instead of high torque starts.

The positioning of the load/unload device near the axis of rotation of the disk consumes less data storage area of the disk surface than an outer diameter location.

The preferred embodiments of the invention will be described with references to drawings which are described below and the detailed description of the invention which follows.

DRAWINGS

Figure 1:
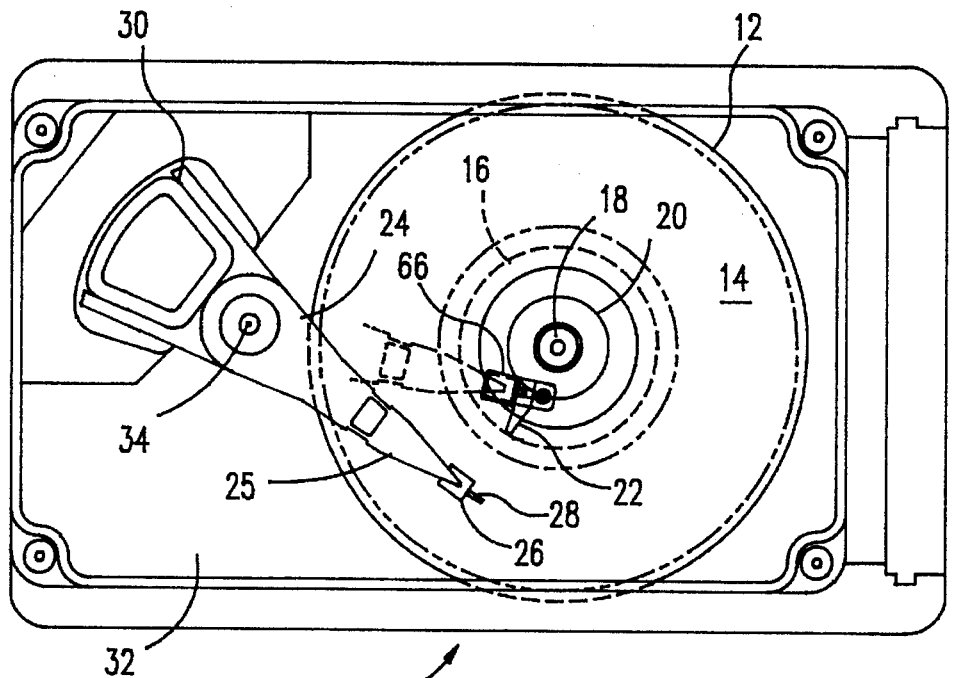
FIG. 1 illustrates a disk drive of the type which can advantageously utilize the present invention.

DETAILED DESCRIPTION OF THE PREFERRED EMBODIMENT OF THE BEST MODE OF THE INVENTION CONTEMPLATED BY THE INVENTORS FOR CARRYING OUT THE INVENTION

During the course of the detailed description of the invention, reference will be made to various figures of the drawings and elements therein by reference numerals, where like items bear the same reference numeral.

Referring initially to FIG. 1, the disk drive 10 is illustrated having a recording disk 12 carrying a magnetic recording surface 14. The disk 12 typically is attached to and concentric with hub 16. Hub 16 typically is rotationally supported on shaft 18. Shaft 18 is a portion of the motor, not shown. Shaft 18 is generally fixed relative to the base plate 32 while the hub 16 is attached to the rotatable member of the drive motor, not shown in FIG. 1. Fixedly attached to the end of shaft 18 is support disk 20. Support disk 20 provides an attaching means and support for load/unload member 22. Load/unload member 22 generally extends radially outward from the axis of shaft 18 and has sufficient width at all points to be able to trace an arcuate path on its upper surface 23, in FIG. 2 the arcuate path centered about pivot axis 34.

In order to read data from or write data representations onto the recording surface 14 of disk 12, a slider 26 which incorporates a magnetic read/write head, not shown, is disposed over recording surface 14 of disk 12. Slider 26 is supported in close proximity to the recording surface 14 by an actuator arm 24 and load beam 25. Load beam 25 is a resilient member which exerts a spring force onto slider 26 thus keeping slider 26 in close proximity to the recording surface 14. The slider 26 and recording surface 14 are separated by a thin air film which is pulled underneath slider 26 by the rotation of disk 12. This air film aerodynamically flies slider 26 at a small altitude above the surface of the disk 12 thereby insuring that slider 26 does not impact or contact disk 12 while disk 12 is being rotated; however, at the same time, slider 26 is sufficiently close to recording surface 14 to be able either to read or write data with respect to the magnetic recording surface 14.

Actuator arm 24 is pivotally supported about axis 34 permitting the actuator arm 24, load beam 25, and slider 26 to be pivoted in order to position slider 26 at any point across the recording surface 14 as recording surface 14 rotates beneath slider 26. Accordingly, all recordable regions of recording surface 14 may be accessed by the combination of the movement of the recording disk 12 and the pivot movement of actuator arm 24. Actuator arm 24 is positioned by actuator drive 30 which is electronically controlled to select the pivoted position of actuator arm 24 and load beam 25. Shaft 18 and pivot axis 34 are both spatially positioned and fixed relative to each other by base plate 32, thereby insuring accurate, repeatable positioning of slider 26 over recording surface 14 of disk drive 10.

Extending from the distal end of load beam 25 is tang 28. Tang 28 may be engaged by load/unload device 22 when the load beam 25 is pivoted inwardly toward the shaft 18. Should it be desired to turn off the disk drive motor and thus stop providing power to rotate the disk 12, it would be necessary to unload slider 26 from the recording surface 14.

This unloading is necessary to prevent damage to the recording surface 14 when slider 26 contacts recording surface 14 due to the dissipation of the aerodynamic film between the disk 12 and slider 26. Further, it insures that when disk 12 again is rotated, the slider 26 will not be resting on the disk 12 surface 14 and therefore cannot abrade or otherwise damage the recording surface 14 during disk rotation start-up or spin-up. Further, the friction forces between the slider 26 and disk 12, when at rest, resist spin-up and starting. Also removal of the slider 26 from the disk 12 eliminates the disk 12/slider 26 forces that could prevent starting of the motor and delay disk 12 spin-up.

Figure 2:
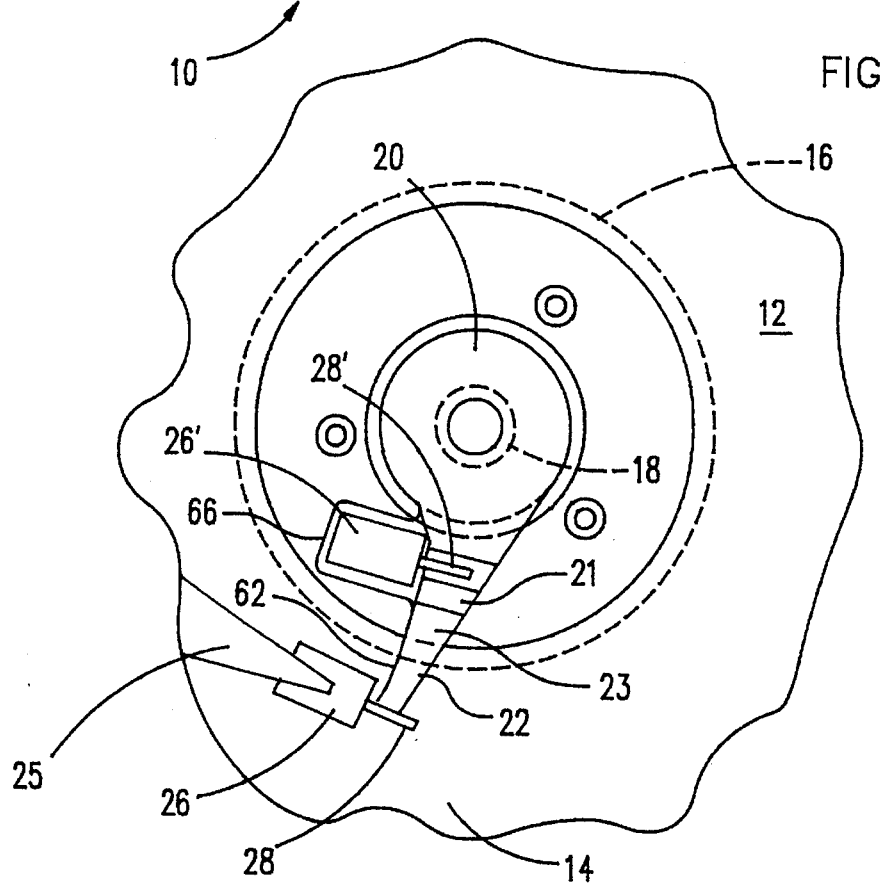
FIG. 2 is an enlarged view of the disk drive spindle motor, hub, shaft, and shaft mounted load/unload device.

As actuator arm 24 and load beam 25, together with slider 26 and tang 28 are pivoted toward shaft 18, tang 28 will contact the upper surface 23, in FIG. 2 of load/unload device 22 and will be forced in a direction away from the recording surface 14 of disk 12. As further pivoting motion moves tang 28 closer to the center of disk 12, the distance between slider 26 and recording surface 14 will increase due to the upward force exerted on tang 28 by surface 23 and the resultant flexure of load beam 25.

Figure 3:
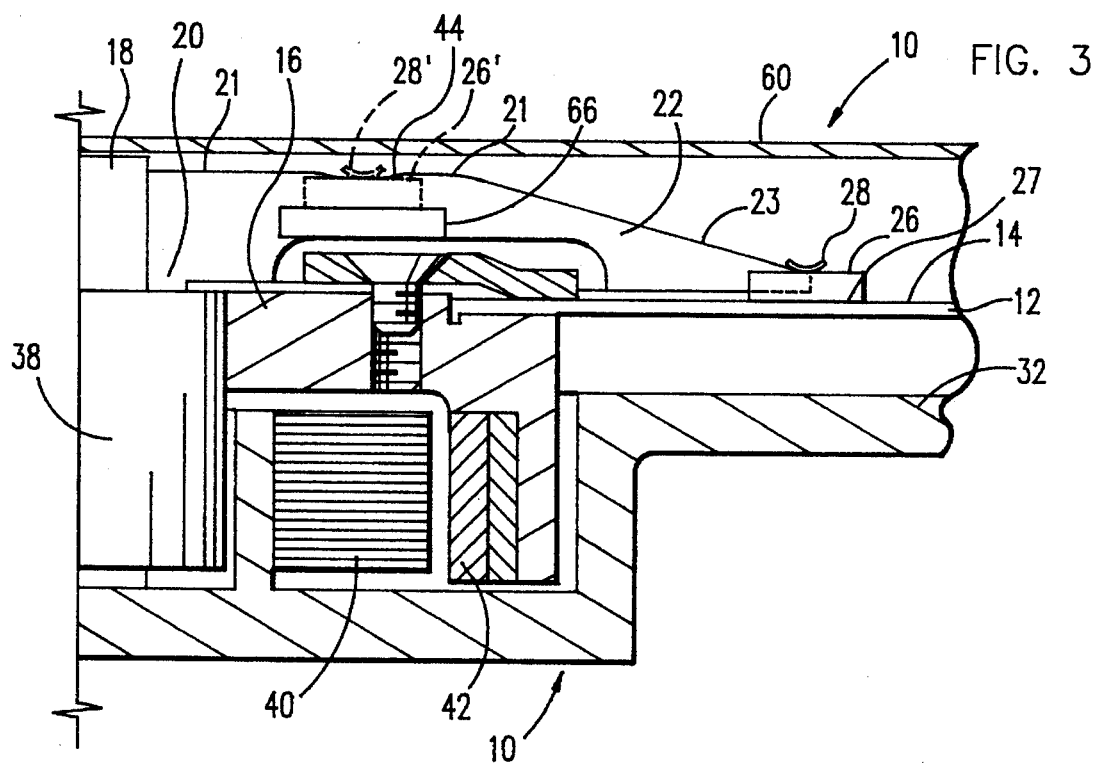
FIG. 3 is a cross-section of a disk drive including a motor, hub, disk, and shaft mounted load/unload device.

The displacement of the slider 26 thus may be observed in FIG. 3.

Disk 12 is supported by hub 16. Hub 16 may form a part of rotor 42 of the electrical drive motor of the disk drive 10. The stator 40 is the other significant portion of the drive motor. Rotor 42 is supported in a rotational relationship with shaft 18 by bearing assembly 38. Shaft 18 typically is fixedly engaged with the base plate 32 and remains stationary. Attached to and positioned surrounding shaft 18 is support disk 20. Extending from shaft 18 in a generally radial direction, is the load/unload device 22, as illustrated in FIG. 3, formed as a shallow rise ramp surface 23 or wedge. Slider 26 is illustrated overlying disk 12; in actuality, a very small air gap 27 exists between slider 26 and the recording surface 14 of disk 12. Slider 26 is supported by load beam 25, which is not visible in FIG. 3. However, tang 28, an extension of load beam 25, is illustrated as it engages inclined surface 23 of load/unload device 22.

As can be readily observed in FIG. 3, whenever slider 26 is moved toward shaft 18, the tang 28 will be forced to rise along surface 23; because tang 28 and slider 26 move in concert, slider 26 will be withdrawn from close proximity to surface 14. When tang 28 has reached the apogee of its movement along surface 23, tang 28 is translated to a depressed region 44 formed in the shape of a trough extending across load/unload device 22 by actuator 30 (FIG. 1). Tang 28 then will be resting in trough 44 as illustrated in FIG. 3. Tang 28 is illustrated in this position as 28'. The spring force of the load beam 25 against the upward movement of tang 28' will act as a detenting force and will inhibit the movement of tang 28' out of the trough 44, except when such spring force is overcome by actuator 30. Accordingly, slider 26' and tang 28' will be retained in the detented position and will not be permitted to slide down surface 23 to undesirably and inadvertently contact surface 14 of disk 12. The trough 44 depressed into surface 21 forms a retaining means effective to retain the tang 28 or 28' together with slider 26 or 26' in their retracted and withdrawn position well away from surface 14.

After disk 12 is restarted and rotating at a desired rotational velocity, the actuator drive 30 seen in FIG. 1 may act to pivot actuator arm 24 and thereby force the tang 28' out of trough 44 and across surface 21 onto surface 23. Then further translation of the tang 28 down surface 23 will re-present slider 26 to the aerodynamic air bearing film in gap 27 on top of surface 14 for continued normal operation of the disk drive 10. The slope of surface 23 with respect to the recording surface 14 of disk 12 desirably is made quite shallow, typically not more than 20 degrees of an included angle between surface 23 and recording surface 14. The small included angle between these two surfaces 23, 14 results in a much smaller velocity vector toward the disk 12 due to the momentum of slider 26 and the spring force of load beam 25 as the tang 28 rides down slope 23 toward disk 12. The much smaller and more controllable relative velocity of slider 26 toward disk 12 significantly will reduce the possibility of crashes or slider impacts into the surface of disk 12.

Tang 28 preferably is fabricated in the shape of an arcuate segment of a hollow cylinder. This shape when engaged with the surfaces 23, 21, 44 insures that the contact between the respective surfaces and tang 28 forms a line or a point contact. The line contact will be sufficient to raise slider 26 away from surface 14 while at the same time reducing the frictional load between surfaces 23, 21, 44 and tang 28. With a reduced frictional load, tang 28 may be moved relative to surfaces 23, 21, 44 with ease and thus may be more precisely controlled by the actuator drive 30 whenever tang 28 is moved downward along surface 23 to reposition slider 26 above recording surface 14. Further, the actuator drive 30 may not need to be sized in a significantly larger version to overcome these forces.

To further reduce frictional loads exerted on tang 28 and consequently actuator drive 30, the load/unload device 22 may be fabricated of a rigid plastic material which has been loaded with polytetrafluoroethylene (PTFE) particles. The PTFE particle loading will inherently produce a surface on which the PTFE particles will be exposed. By virtue of PTFE being a very low co-efficient of friction material, the movement of tang 28 over surfaces 23, 21, 44 will be greatly enhanced.

Figure 4:
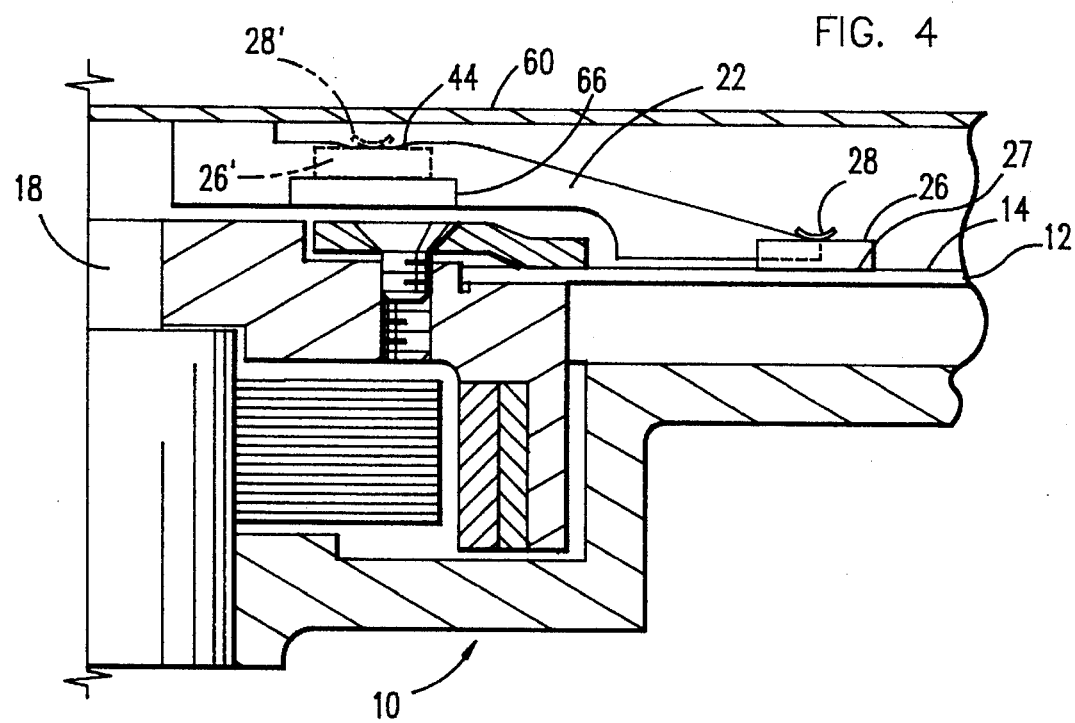
FIG. 4 is a cross-section of a disk drive with the load/unload device being cover mounted.
Figure 5:
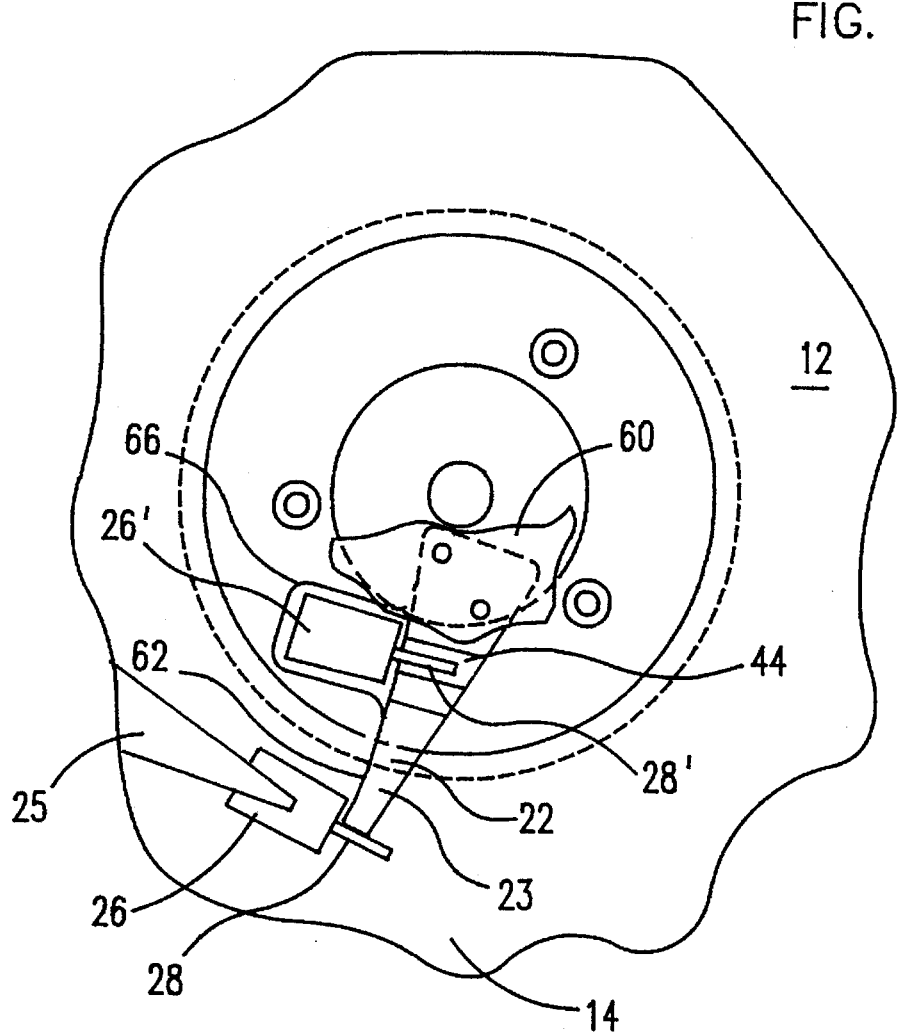
FIG. 5 is an enlarged view of the disk drive hub, shaft and cover mounted load/unload device.

With brief reference to FIGS. 4 and 5, the load/unload device 22 is illustrated as attached to the cover 60 of the disk drive 10. The attachment of the cover 60 may be advantageous to define the position of the load/unload device 22 without precise regard to shaft 18, thus simplifying manufacture. In all other respects, the operation of the load/unload device 22 in conjunction with tang 28 and slider 26 are identical to that described with respect to FIGS. 2 and 3.

Referring again to FIGS. 2 and 5, it should be noted that the surface 62 of the load/unload device 22 preferably is formed in an arcuate shape, the center of the arcuate segment being the pivot axis 34 around which the actuator arm 24 and load beam 25 pivot. This arcuate formation of the surface 62 insures that the engagement between tang 28 and the surface 23 of the load/unload device 22 is effective through all phases of movement of the tang 28 to and from the trough 44 to support the slider 26 in its raised or retracted position away from the recording surface 14 of disk 12.

Figure 6:
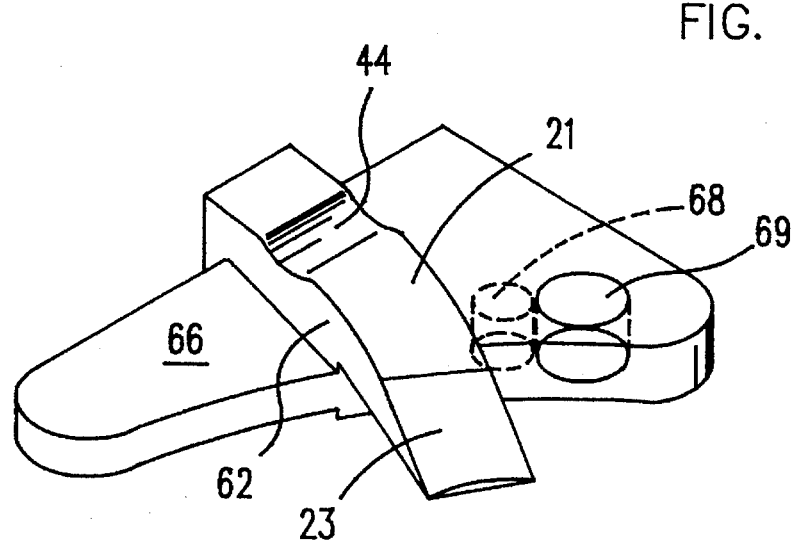
FIG. 6 illustrates the load/unload device with an arcuate ramp surface and a ramp surface having two distinct slopes.

With reference to FIG. 6 and FIG. 1, an additional embodiment of the load arm/unload device 22 is shown with curved surfaces 21, 23. Surface 21 is substantially parallel to a disk 12 to which it is closely positioned, while surface 23 is sloped to remove slider 26 from disk 12 as in FIG. 1. Hole 69 and pin 68 are provided to locate and to mount the device 22. Other conventional locating and attaching techniques may be used, so long as the load/unload device 28 is fixed in position relative to the actuator load beam pivot axis 34 and stator shaft 18. The curve of surfaces 21, 23 creates a point contact with tang 28 in FIG. 1, thereby reducing frictional forces.

Surface 66 is disposed relative to trough 44 so that the surface of slider 26 that most closely approaches the disk 12 during flight will be disposed proximate thereto. With the slider 26 in a close position to the surface 66, the slider 26 will be unable to move a significant distance or to rotate a significant amount in the event that the disk drive 10 is bumped or jarred, creating significant inertial loads on the slider 26. Without the surface 66 acting as a stop for the slider 26, the mass of the slider 26 may be sufficient to overstress the support of the slider 26 which is a part of the load beam 25.

The load/unload device 22 of FIG. 6 may be formed in a mirror image shape and mounted on the frame or base plate 32 of the disk drive 10 to interact with a load beam 25 and slider 26 disposed to scan a second side of disk 12.

One very significant aspect of the load/unload device 22 is that it be relatively short in length and have a shallow rise dictated by the small included angle between surfaces 23 and 14 is that in the event of power failure during operation, slider 26 may be withdrawn from the disk recording surface 14; also the actuator arm 24, load beam 25, and tang 28 may be pivoted to engage tang 28 with trough 44 in order to prevent damage to the recording surface 14 as a result of the disk 12 stopping. The removal of the slider 26 from the vicinity of recording surface 14 upon power failure utilizes the fact that the rotational momentum of the hub 16 and disk 12 will cause the drive motor comprised of rotor 42 and stator 40 to form and operate as a generator. The generating function of the rotor 42 and stator 40 will create sufficient electrical energy to permit the actuator arm assembly 24 to be driven from a position over the recording surface 14 into engagement with load/unload device 22 and into a position where tang 28 is engaged with trough 44 and thus is detented in its stored/retracted position. If the slope of surface 23 is too steep, insufficient power may be generated by the stator 40 and rotor 42 during this coasting powering-down period to be able to propel tang 28 all the distance to trough 44. Further, the surface 23 may be rounded to insure a point contact with the load beam, particularly the tang 28 and the ramp surface 23.

The need for a very low force load/unload capability is emphasized whenever disk drives are reduced in size to be used in computers such as portables and lap top type computers. With portable and lap top type computers operating on batteries, the disks are started and stopped very frequently to maximize the amount of stopped time thus eliminating battery drain. With requirements expected to specify that the start/stop cycles of a disk drive will number approximately one million during the life of a disk drive, it is essential that the method used to remove and hold the slider out of engagement with the disk drive recording surface be highly reliable, very simple, and have an extremely low power consumption.

While the invention has been illustrated and explained with reference to these embodiments, it is expected that other minor modifications may be made to the invention without departing from the scope of the protection granted by the appended claims.

We claim:

1. A disk drive for the storage and retrieval of data comprising:

a base plate;

a disk with two sides having a magnetic coating on at least one of said two sides, said disk having an inside edge;

a hub fixedly attached to said disk for supporting said disk;

an electric motor having at least a rotor for rotating said disk and said hub;

said hub, having an axis of rotation, and drivingly engaged with said rotor;

a shaft fixedly supported by said base plate and coaxial with said hub and said disk, said shaft rotatably supporting and extending through said hub;

a magnetic read/write head;

an actuator arm for positioning said magnetic head relative to said disk and moveable to pass said head over said magnetic coating of said disk in a generally radial path relative to said hub;

a load/unload ramp for displacing said head from said magnetic coating of said disk in response to said actuator arm movement of said head toward said axis of rotation of said hub, said load/unload ramp comprising an inclined surface with an included angle between said disk and said inclined surface of less than 20 degrees, said load/unload ramp further including a retaining formation displaced from said disk and engageable with said actuator arm for holding said magnetic head in a position displaced from said disk, said load/unload ramp disposed proximate said axis of rotation, fixedly supported by said shaft, and extending generally radially from said axis of rotation and over said inside edge.

2. The disk drive of claim 1 wherein:

said actuator arm includes an actuator axis of rotation and comprises at least one load beam having a longitudinal axis extending through said axis of rotation of said actuator arm;

said load beam comprises an extension projecting radially from said axis of rotation of said actuator arm, beyond said magnetic head and into engagement with said load/unload ramp, when said load beam is rotated to approach said axis of rotation of said hub;

said extension comprises an external surface of a partial cylinder disposed for engagement with a curved engageable surface of said load/unload ramp to form a point contact.

3. The disk drive of claim 1 wherein:

said actuator arm includes an actuator axis of rotation;

said load/unload ramp is arcuately shaped and said shape is arcuate around a center of curvature substantially co-located with said axis of rotation of said actuator arm.

\* \* \* \* \*